July 6, 1943.　　　　H. S. OGDEN　　　　2,323,413
BRAKING SYSTEM
Filed Nov. 21, 1941
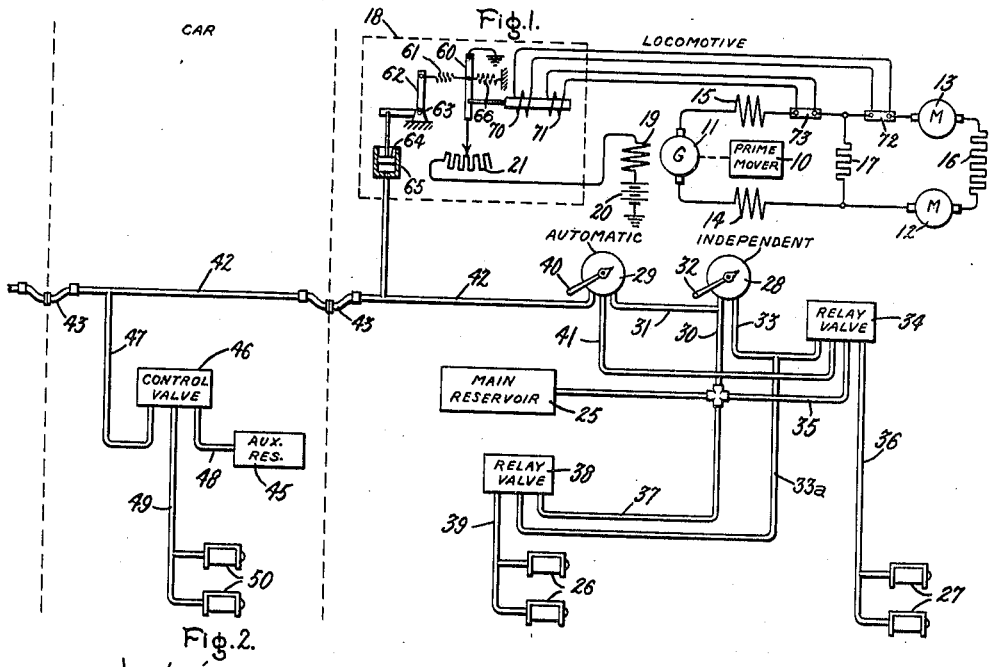
Inventor:
Harold S. Ogden,
by Harry E. Dunham
His Attorney.

Patented July 6, 1943

2,323,413

UNITED STATES PATENT OFFICE 2,323,413

BRAKING SYSTEM

Harold S. Ogden, Erie, Pa., assignor to General Electric Company, a corporation of New York Application November 21, 1941, Serial No. 419,924

15 Claims. (Cl. 303—3)

My invention relates to braking systems for electric vehicles, and particularly to combined frictional and electric braking systems for self-propelled electric locomotives having an explosive or expansible fluid prime mover and arranged to draw a trailing train. The invention is particularly applicable to steam- or Diesel-electric locomotives provided with the usual air and dynamic braking systems.

It is generally understood that in main line passenger train service where stops are frequent and in heavy freight service the braking load on the locomotive is so great that the brake shoes and wheels rapidly become overheated if friction braking alone is provided. For this reason some form of electrical braking, particularly dynamic or rheostatic braking, has been used extensively within the past few years. Electrical braking alone, however, is insufficient, since the braking effort required for normal service stops is much more than can be available from the electrical equipment allowance, and therefore it becomes necessary to resort to some combination of electrical and frictional braking. While such a combined braking system considerably reduces the wear on the locomotive brake shoes, care must be exercised to match the braking characteristic of the locomotive with that of the trailing train. It is especially desirable to ensure that the braking effort exerted by the locomotive, while varying generally with speed in the same manner as that of the trailing train, remains at all times slightly less than that of the train, so that the slack in the train is constantly stretched.

Accordingly, it is an object of my invention to provide a combined electric and frictional braking system for an electric locomotive in which the braking effort matches the braking effort characteristic of a frictionally braked trailing train.

It is a further object of my invention to provide a combined dynamic and frictional braking system for an electric locomotive in which the dynamic and frictional brakes are automatically coordinated to produce a resultant braking effort characteristic which is qualitatively similar but quantitatively less than the braking effort characteristic of a frictionally-braked trailing train over substantially the entire speed range of the locomotive.

It is a still further object of my invention to provide a combined dynamic and air braking system for an electric locomotive in which the braking effort is more uniform than heretofore, and in which the maximum braking effort at low vehicle speed falls appreciably below the high peaks heretofore experienced.

To the attainment of the above and other objects and advantages I provide an electric locomotive and trailing train with any well-known type of fluid actuated friction braking system and with a standard dynamic braking circuit for the traction motors, and then provide a regulating device responsive to the brake pipe pressure for controlling the amount of dynamic braking in accordance with the amount of air braking being applied.

From the foregoing it will be understood that by the term "friction brakes" I mean any brakes having stationary and moving parts pressed into frictional engagement, whether the moving part be mechanically, pneumatically or hydraulically actuated.

For a better understanding of my invention reference should now be had to the following detailed specification taken in conjunction with the accompanying drawing in which Fig. 1 is a schematic diagram of an electric and frictional train braking system embodying my invention; Fig. 2 is a graphical representation of a typical braking effort characteristic for the system shown at Fig. 1; Fig. 3 is a fragmentary schematic diagram of a braking system embodying my invention in a modified form; and Fig. 4 is a graphical illustration of a typical braking effort characteristic for the system of Fig. 3.

Referring now to the drawing, I have shown at Fig. 1 a power system and braking system for an electric locomotive and a braking arrangement for the trailing train. By way of illustration I have shown my invention as applied to a self-propelled electric locomotive, the power system of which includes a prime mover 10, a main direct current generator 11 driven by the prime mover and a plurality of direct current traction motors having armatures 12 and 13 and series field windings 14 and 15, respectively. While the motoring circuits have not been shown, it will be understood by those skilled in the art that means are provided for connecting the generator 11 to supply current to the motors 12, 14 and 13, 16 to drive the vehicle.

At Fig. 1 I have shown the traction motors connected in a differential dynamic braking circuit similar in its broader aspects to that shown in Patent 2,248,577—issued on July 8, 1941, to Jacob W. McNairy, except that in the circuit of Fig. 1, the main generator 11 is used for exciting the traction motor series field windings 14 and 15 during braking operation. As shown, this arrangement comprises a dynamic braking circuit including the armatures 12 and 13 of the traction motors connected in series with a dynamic braking resistor 16 and a stabilizing resistor 17, in combination with a field exciting circuit including the traction motor series field windings 14 and 15 connected in series circuit relation with the main generator 11 across the stabilizing resistor 17. As is fully explained in the above-identified patent to McNairy, this differential dynamic braking circuit is so connected that the voltage generated in the armatures 12 and 13 of the traction motors opposes the voltage of the generator 11, the generator being connected to supply current to the series field windings 14 and 15 in the same direction as the current flowing through these windings during motoring operation. As a result of this arrangement, the stabilizing resistor 17 carries the sum of the armature current and the field current so that as the armature current increases and the voltage drop across the stabilizing resistor 17 increases, the voltage available for exciting the series field windings 14 and 15 decreases. Thus, if the voltage of the generator 11 is maintained substantially constant, the dynamic braking effort remains substantially constant over a wide range of vehicle speed. It will be understood, of course, that during dynamic braking operation the main generator 11 is operated at the substantially constant speed of the prime mover 10. If the prime mover 10 is a Diesel or other internal combustion engine, the idling speed is ordinarily less than its operating speed while supplying power to drive the vehicle, while if the prime mover 10 is of the expansible fluid type such as a steam or gas turbine it will ordinarily be provided with a governor adapted to maintain its speed substantially constant at all times.

In order to control the dynamic braking effort exerted by the traction motors 12, 14, and 13, 15 as the vehicle speed changes and to vary the dynamic braking in amount in accordance with variations in the braking effort of the friction brakes, I provide a regulating device 18. The regulating device 18 is arranged to control the excitation of a separately excited generator field winding 19 in accordance with the sum of the traction motor field and armature currents or proportionate parts thereof and in accordance with a controlling fluid pressure in the air braking system. The generator field exciting winding 19 is energized from a battery 20 and is connected in series with a regulating resistor 21, the resistance of which is controllable by the regulating device 18 as will be further described hereinafter.

Referring now to the air braking system, the arrangement shown in Fig. 1 is a conventional "Standard" system for controlling the air brakes on both the locomotive and the trailing train. As indicated, the locomotive air braking system comprises a main air reservoir 25 in which a supply of compressed air is maintained at a predetermined pressure and which is adapted to supply such air at controllable pressure to a plurality of locomotive driver air brakes 26 and a plurality of locomotive guiding truck air brakes 27. A manually operable "independent" air valve 28 is arranged to apply the air brakes on the locomotive alone, while a second similar manually operable "automatic" air control valve 29 is arranged to apply the air brakes simultaneously to the locomotive and to all the trailing cars. The main reservoir 25 is connected to supply air at a predetermined constant pressure to the "independent" control valve 28 through a conduit 30 and to the "automatic" control valve 29 through a branch conduit 31. The control valve 28 is provided with a manually-positionable control lever 32 which is arranged to connect the conduit 30 to a conduit 33 and to regulate the rate of flow of air to the conduit 33. The magnitude of the air pressure in the conduit 33 is determined by the length of time the valve 28 is left open, and may be held constant at any desired point by returning the valve 28 to its "lap" position in which all ports are sealed off and the desired pressure is retained. The conduit 33 is connected to a relay valve 34 having an incoming conduit 35 from the main air reservoir 25 and an outgoing conduit 36 through which air at controllable pressure may be supplied to the guiding truck air brakes 27. As is well understood by those versed in the art, the relay valve 34 is so arranged that the magnitude of the pressure in the conduit 33 controls the magnitude of the air pressure supplied to the conduit 36 from the conduit 35. Similarly, air pressure from the main reservoir 25 is supplied to the driver air brakes 26 through a conduit 37, a relay valve 38 and a conduit 39. The controllable pressure in the conduit 33 is also arranged to control through a conduit 33a the connection between the conduits 37 and 39 in such a manner that the pressure in the conduit 39 is proportional to the pressure in the conduit 33.

The manually-controllable "automatic" air valve 29 is similar to the valve 28 but is provided with additional pressure control means so that it applies the air brakes simultaneously to the locomotive and to all of the trailing cars. As previously stated, air from the main reservoir 25 is supplied to the valve 29 through a conduit 31. The valve 29 is so arranged that a handle 40 controls the magnitude of the pressure supplied through the valve to a conduit 41. The controllable pressure in the conduit 41 is arranged to control the relay valves 34 and 38 in the same manner as the controllable pressure in the conduits 33 and 33a. In addition to locomotive air brake control through the conduit 41, the "automatic" air valve 29 is also arranged to produce in a brake pipe or a train conduit 42 a pressure reduction proportionate to the pressure increase in the conduit 41. The brake pipe 42 normally carries air under pressure, and when no air braking is being applied this pressure is at its maximum value. The brake pipe 42 is connected from the locomotive to each car of the trailing train through flexible connecting conduits 43. Each trailing car, such as car No. 1 diagrammatically illustrated on Fig. 1, is provided with a separate air braking system controlled from the brake pipe 42 in accordance with the magnitude of the pressure reduction in the brake pipe. For example, car No. 1 is provided with an auxiliary air reservoir 45 which is arranged to supply compressed air at a predetermined substantially constant pressure to a control valve 46. A branch conduit 47 from the brake pipe 42 is connected to the control valve 46 which is arranged to connect a conduit 48 from the auxiliary reservoir to a conduit 49, thereby to supply to the conduit 49 an air pressure proportional to the pressure reduction in the brake pipe 42. The conduit 49 supplies compressed air at this controllable pressure to a plurality of car air brakes 50.

As previously mentioned, the regulating device 18 is provided for coordinating the dynamic braking effort with the air braking effort on the locomotive. For this purpose, the excitation of generator field winding 19 is controlled by moving a pivoted switch arm 60 across the variable resistor 21 in accordance with the sum of the traction motor field and armature currents and in accordance with the degree of pressure reduction in the brake pipe 42. The movable brush arm 60 is connected by means of a tension spring 61 to a bell crank lever 62 pivoted at a point 63 and having its opposite arm connected to a piston 64 working in a cylinder 65 which is connected to the brake pipe 42. The spring 61 exerts a restraining force biasing the brush arm 60 to a position in which the resistance of the resistor 21 is a minimum. To ensure return of the switch arm 60 to its extreme right-hand position when the brake pipe pressure is a maximum a light return spring 66 is provided for bringing the arm 60 to its position of maximum resistance in the generator field circuit. Electromagnetic actuating means comprising a pair of coils 70 and 71 is provided for drawing the brush arm 60 to a position of maximum resistance against the restraining force of the spring 61. The actuating coil 70 is connected to a current shunt 72 in the dynamic braking circuit and carries a current proportional to the traction motor armature current. Similarly, the actuating coil 71 is connected to a current shunt 73 in the field excitation circuit of the traction motors and carries a current proportional to that in the traction motor series field windings.

In operation, when the train is in motion with the air brakes released, the pressure in the brake pipe 42 is a maximum and the bell crank lever 62 is rotated in a counterclockwise direction as viewed in Fig. 1 so that there is no tension in the spring 61 and the brush arm 60 is in its extreme right-hand position, thereby to maintain the field circuit of the main generator 11 open. When the operator reduces the brake pipe pressure to a predetermined point by manipulating the control handle 40 in the act of applying the "automatic" air brakes, the bell crank lever 62 is moved in a counterclockwise direction as viewed in Fig. 1, and tension is applied to the spring 61 to draw the brush arm 60 toward the left as viewed in Fig. 1. Since the braking effort exerted by the air brake system is directly proportional to the pressure in the brake pipe 42, the bell crank lever 62 will assume a predetermined position for any predetermined friction braking effort. In moving toward the left, the brush arm first closes the circuit of the generator field winding 19 with the full resistance of the resistor 21 connected in circuit, and then gradually cuts out portions of the resistor 21. As the field resistance is cut out the traction motor field current increases and hence the armature current increases and dynamic braking builds up. As the traction motor field and armature currents increase the additive forces exerted by the actuating coils 70 and 71 of the regulating device 18 increase and draw the brush arm 60 to the right to increase the field resistance. When the combined force of the coils 70 and 71 is just equal to the force applied in the opposite direction by the tension spring 61, the brush arm 60 will come to rest in an equilibrium position.

As the vehicle speed decreases, the voltage generated by the traction motor armatures 12 and 13 decreases and the armature current decreases. Since the actuating coils 70 and 71 control the regulating resistor 21 in such a manner as to tend to maintain constant the sum of the armature and field currents or predetermined portions thereof, the brush arm 60 will be permitted to move to the left as viewed in Fig. 1, thereby to reduce the resistance in the field circuit of the generator and to increase the field current of the traction motors as the armature current decreases. As previously pointed out, the dynamic braking effort would be substantially constant over a wide range of vehicle speeds if the generator voltage remained constant. The decrease of field resistance produced by the regulator 18 modifies the dynamic braking characteristic to provide a gradually and slightly increasing dynamic braking effort as the vehicle speed decreases to the point where all the generator field resistance is cut out, whereupon further decrease in vehicle speed necessarily results in a dropping off of the dynamic braking effort. In the preferred form of my invention the sum of the entire armature current and a portion of the field current is maintained constant. It will be understood, however, that it is within the scope of my invention to maintain constant the sum of the entire armature and field current or any predetermined smaller portions of either or both such currents. When the brush arm 60 arrives at its extreme left-hand position in regulating the sum of the field and armature currents to a constant value, the entire regulating resistor 21 will have been cut out of the generator field excitation circuit and the regulator will thereafter maintain a substantially constant predetermined generator field current.

The operation described above takes place when a predetermined brake pipe pressure and consequently a predetermined braking effort is maintained. It will be observed that the position of the switch member 60 on the resistor 21 when in equilibrium depends upon both the actuating force of the coils 70 and 71 and upon the degree of reduction of pressure in the cylinder 65. Thus, the bell crank lever 62 is movable in accordance with brake pipe pressure to recalibrate or change the setting of the regulator 18 in accordance with the braking effort being maintained at the air brakes.

At Fig. 2 I have shown a plurality of curves representing braking effort in miles per hour per second of deceleration plotted against vehicle speed in miles per hour for the various coordinate parts of my braking system. The curve A represents the dynamic braking effort exerted by the traction motors for any predetermined braking effort of the "automatic" air braking system as determined by the air pressure introduced into the brake cylinders by the manually operable control valve 29 of Fig. 1. By way of example, the maximum obtainable effort, as limited by wheel slippage, has been chosen, and the curve B represents this maximum braking effort characteristic for the trailing train. In one calculated installation it has been found that the curve B will fall below three miles per hour per second deceleration until the vehicle speed is below twenty miles per hour. Below this speed the coefficient of friction between the wheels and the brake shoes has so increased that a greater rate of deceleration may be maintained. As is well understood by those skilled in the art, the shape of the curve B is determined by the changing coefficient of friction as the vehicle speed changes. It will be noted that the dynamic braking effort is substantially constant over a wide range of speed, as between 30 and 80 miles per hour, there being a slight and gradual increase in braking effort down to about 40 miles per hour due to the action of the regulator 18, and a sharp decrease thereafter due to decreasing vehicle speed with the generator field resistance all out. The dynamic braking characteristic curve A is thus controlled to have a shape substantially the same as that of the friction braking characteristic B over a wide range of relatively high vehicle speeds and to limit the total braking effort C as the dynamic braking decreases sharply at low vehicle speeds.

To illustrate the effect of my present invention, a curve C has been drawn to represent the total braking effort exerted at the locomotive wheels as a result of the combined effects of dynamic braking and locomotive air braking. The curve C is drawn to represent the sum of the curve A and a curve similar to the curve B for about ⅓ of the braking effort represented by the curve B. From the curve C it will be noted that the maximum braking effort exerted by the locomotive produces a deceleration of less than three miles per second and never rises to the very high peak indicated by the lower end of the curve B. Furthermore, attention is directed to the fact that the total braking effort exerted by the locomotive, as shown by curve C, is at all times less than the braking effort exerted by the trailing train, as represented by the curve B. Consequently, the slack in the train is always stretched. It will be understood, of course, that the resultant braking characteristics as shown at Fig. 2 are obtained by so proportioning the air braking systems of the locomotive and trailing train in relation to the dynamic braking system of the locomotive that the braking effort exerted by the locomotive air brakes is always less in a predetermined ratio than the braking effort exerted by the car air brakes, while the total braking effort of the locomotive, including the dynamic braking arrangement, is less than that of the trailing train air brakes. After all these elements have once been adjusted their relation is thereafter determined by the pressure in the brake pipe 42.

Referring now to Fig. 3, I have shown the manner in which my invention may be applied to a special type of air braking system known as the "High speed straight air" system. In the system of Fig. 3 the general arrangement of the air and dynamic braking systems is similar to that of Fig. 1 and repetition has been avoided by omitting the common features. However, the "High speed straight air" braking system differs from the "Standard" braking system in that a train line 80, referred to as a "straight air pipe" and normally carrying no air pressure, runs throughout the train parallel to the brake pipe 42. The straight air pipe 80 is arranged to actuate the car control valves by pressure increases rather than pressure reductions. In this system, the pressure in the brake pipe 42 is ordinarily maintained at a maximum value at all times and has no effect upon the control valves in the cars of the trailing train. The purpose of the brake pipe 42 in the system of Fig. 3 is to keep the air brake systems of the cars charged with air at proper pressure and to provide a pressure reduction for operating the control valves in the event that the train should break in two. As shown at Fig. 3, the control valve 81 of car No. 1 is shown connected by a control conduit 81a to the straight air pipe 80 and by a control conduit 82 to the brake pipe 42. Ordinarily, control of the connection between the conduits 48 and 49 is effected by changes of the pressure in the straight air pipe 80.

Referring now to the regulating device 18 of Fig. 3, it will be observed that this devices differs from that of Fig. 1 only in that the bell crank lever is reversed and identified as 62a and that the cylinder 65 is connected to the straight air pipe 80 instead of the brake pipe 42. It will be apparent that positive pressure control of car braking through the straight air pipe 80 has the same effect upon the bell crank lever 62a as does the reduction in pressure from the brake pipe 42 of Fig. 1. The lever 62a is connected to the arm 60 by a tension spring 61a and the operation of the entire system is in all respects entirely similar.

Referring now to Fig. 4, I have shown a plurality of curves $A_1$, $B_1$, and $C_1$ corresponding respectively to the curves A, B, and C of Fig. 2, the curves of Fig. 4 being drawn to represent the conditions of operation of a system such as that shown in Fig. 3. It will be observed that according to Fig. 4, the total braking effort exerted by the locomotive is less than the braking effort exerted by the trailing train down to a vehicle speed to approximately thirty miles per hour, and at this point the braking effort of the locomotive exceeds that of the trailing train. This condition is due primarily to the marked decrease in trailing train braking effort resulting from the "bleeding" of the car air brakes to prevent high braking efforts at low vehicle speed. Such "bleeding" of trailing train air brakes is common with "High speed straight air" systems. It will be understood, of course, that if desired, the elements of the system, particularly the air brakes of the locomotive, may be so adjusted that the total locomotive braking effort will remain less than the trailing train braking effort at all times.

Although I have shown only certain preferred embodiments of my invention by way of illustration, many further modifications will occur to those skilled in the art, and I therefore wish to have it understood that I intend by the appended claims to cover all such modifications as fall within the true spirit and scope of my invention.

What I claim as new and desire to secure by Letters Patent of the United States is:

1. In a braking system for an electric vehicle, friction brakes for said vehicle, manually-controllable means for controlling the application of said friction brakes, an electric traction motor for driving said vehicle having an armature and a series field winding, a dynamic braking resistor, means for completing a dynamic braking circuit including said armature and said resistor, a source of electric current supply connected in series circuit relation with said series field winding across a portion of said dynamic braking circuit, regulating means responsive to the currents in said armature and series field winding and arranged to control the excitation of said series field winding, and means responsive to said controllable means to change the setting of said regulating means.

2. In a braking system for an electric vehicle, friction brakes for said vehicle, manually-controllable means for controlling the application of said friction brakes, an electric traction motor for driving said vehicle having an armature and a series field winding, a dynamic braking resistor, means for completing a dynamic braking circuit including said armature and said resistor, a source of electric current supply connected in series circuit relation with said series field winding across a portion of said dynamic braking circuit, a variable resistor operative in conjunction with said source of electric current supply to control the current in said series field winding, switching means for varying the resistance of said resistor, electromagnetic actuating means for said switching means responsive to the currents in said armature and series field winding, restraining means for said switching means, and means responsive to said controllable means for changing the setting of said restraining means.

3. In a braking system for an electric vehicle, fluid actuated friction brakes for said vehicle, a source of fluid supply under pressure, manually-operable control means for supplying fluid at controllable pressure to said brakes from said source of fluid supply thereby to control the application of said friction brakes, an electric traction motor for driving said vehicle having an armature and a series field winding, a dynamic braking resistor, means for completing a dynamic braking circuit including said armature and said resistor, a source of electric current supply connected in series circuit relation with said series field winding across a portion of said dynamic braking circuit, a variable regulating resistor operative in conjunction with said source of electric current supply to control the current in said series field winding, switching means for varying the resistance of said resistor, electromagnetic actuating means cumulatively responsive to the currents in said armature and series field winding for actuating said switching means to increase said resistance, spring means for restraining said actuating means, and means movable in accordance with the pressure of said fluid proportionately to increase the restraining force of said spring as the pressure of fluid supplied to said friction brake increases.

4. In a braking system for a self-propelled electric vehicle, fluid actuated friction brakes for said vehicle, a source of fluid supply under pressure, manually-operable control means for supplying fluid at controllable pressure to said brakes from said source of fluid supply thereby to control the application of said friction brakes, an electric traction motor for driving said vehicle having an armature and a series field winding, an electric generator for supplying current to said motor, said generator having a field exciting winding, a prime mover connected to drive said generator, a dynamic braking resistor, means for completing a dynamic braking circuit including said armature and said resistor, means for connecting said generator in series circuit relation with said series field winding across a portion of said dynamic braking circuit, regulating means actuable in accordance with a function of the current in said portion of said dynamic braking circuit for controlling said field exciting winding, and fluid pressure responsive means for changing the setting of said regulating means in accordance with the pressure of said fluid supplied to said friction brakes.

5. In a braking system for a self-propelled electric vehicle, fluid actuated friction brakes for said vehicle, a source of fluid supply under pressure, manually-operable control means for supplying fluid at controllable pressure to said brakes from said source of fluid supply thereby to control the braking effort of said friction brakes, a direct current electric traction motor for driving said vehicle, said motor having an armature and a series field winding, a direct current generator for supplying current to said motor, said generator having a field exciting winding, a prime mover connected to drive said generator, a dynamic braking resistor, means for completing a dynamic braking circuit including said armature and said resistor, means for connecting said generator in series circuit relation with said series field winding across a portion of said dynamic braking circuit thereby to excite said series field winding, regulating means for controlling the excitation of said field exciting winding, said regulating means including actuating means cumulatively responsive to the currents in said series field winding and said armature, restraining means for said regulating means, and means actuable in accordance with the pressure of said fluid to change the setting of said restraining means in proportion to changes in value of said braking effort.

6. In a braking system for a self-propelled electric vehicle, fluid actuated friction brakes for said vehicle, a source of fluid supply under pressure, manually-operable control means for supplying fluid at controllable pressure to said brakes from said source of supply thereby to vary the braking effort of said brakes, a direct current traction motor for driving said vehicle, said motor having an armature and a series field winding, a direct current generator for supplying current to said motor, said generator having a field exciting winding, a dynamic braking resistor, means for completing a dynamic braking circuit including said armature and said resistor, means for connecting said generator in series circuit relation with said series field winding across a portion of said dynamic braking circuit thereby to excite said series field winding, a regulating resistor connected in series circuit relation with said field exciting winding, switching means for varying the resistance of said regulating resistor, actuating means for said switching means cumulatively responsive to the currents in said armature and said series field winding, restraining means for said switching means, and means actuable in accordance with the pressure of said fluid for adjusting the calibration of said restraining means in proportion to the value of said braking effort.

7. In a braking system for a self-propelled electric vehicle, fluid actuated friction brakes for said vehicle, a source of fluid supply under pressure for actuating said brakes, manually-operable control means for supplying fluid at controllable pressure to said brakes from said source of supply thereby to control the braking effort exerted by said brakes, a direct current electric traction motor for driving said vehicle, said motor having an armature and a series field winding, a direct current generator for supplying current to said motor, said generator having a field exciting winding, a dynamic braking resistor, means for completing a dynamic braking circuit including said armature and said resistor, means for connecting said generator in series circuit relation with said series field winding across a portion of said dynamic braking circuit thereby to excite said series field winding, a variable regulating resistor connected in series circuit relation with said field exciting winding, switching means for varying the resistance of said regulating resistor to control the voltage of said generator, electromagnetic actuating means for said switching means cumulatively responsive to the currents in said armature and said series field winding, spring restraining means for said switching means having one end connected to said switching means, and movable means connected to the other end of said spring means and movable in accordance with the pressure of said fluid to change the setting of said restraining means in proportion to changes in the magnitude of said braking effort.

8. In a braking system for a train of vehicles including a locomotive, fluid actuated friction brakes for each of said vehicles, a source of fluid supply under pressure on each of said vehicles for actuating the friction brakes on the same vehicle, manually-operable control means on said locomotive arranged simultaneously to supply fluid at controllable pressure from each of said sources of fluid supply to said friction brakes on the same vehicle thereby proportionately to control the frictional braking effort applied to each of said vehicles, an electric traction motor for driving said locomotive, a dynamic braking resistor for said traction motor, means for completing a dynamic braking circuit including said motor and said resistor, automatic means for controlling the current in said braking circuit thereby to maintain the dynamic braking effort substantially constant over a wide range of vehicle speed, and means movable in proportion to the braking effort applied to said locomotive to calibrate said automatic means in a predetermined following relation to said frictional braking effort.

9. In a braking system for a train of vehicles including a locomotive, fluid actuated friction brakes for each of said vehicles, a source of fluid supply under pressure on each of said vehicles for actuating the friction brakes on the same vehicle, manually-operable control means upon said locomotive arranged simultaneously to supply fluid at controllable pressure from each said source of fluid supply to the friction brakes on the same vehicle, an electric traction motor for driving said locomotive, a dynamic braking resistor for said traction motor, means for completing a dynamic braking circuit including said motor and said resistor, regulating means including a variable resistor arranged to control the current in said braking circuit, switching means actuable in accordance with a function of the current in said braking circuit for varying the resistance of said resistor, restraining means for said switching means, and means actuable in accordance with the pressure of said fluid to change the setting of said restraining means in proportion to the pressure of the fluid supplied to said friction brakes.

10. In a braking system for a train of vehicles including a self-propelled locomotive, fluid actuated friction brakes for each of said vehicles, a source of fluid supply under pressure on each of said vehicles for actuating the friction brakes on the same vehicle, manually-operable control means mounted upon said locomotive and arranged simultaneously to supply fluid at controllable and proportionate pressure from each said sources of fluid supply to the friction brakes on the same vehicle, a direct current electric traction motor for driving said locomotive, said motor having an armature and a series field winding, a direct current generator for supplying current to said motor, said generator having a field exciting winding, a prime mover mounted upon said locomotive and connected to drive said generator, a dynamic braking resistor, means for completing a dynamic braking circuit including said armature and said resistor, means for connecting said generator in series circuit relation with said series field winding across a portion of said dynamic braking circuit thereby to excite said series field winding, a regulating resistor connected in series circuit relation with said field exciting winding, switching means for varying the resistance of said regulating resistor, actuating means for said switching means cumulatively responsive to the currents in said armature and said series field winding, restraining means for said switching means, and means actuable in accordance with the pressure of said fluid for adjusting the setting of said restraining means in proportion to the pressure of the fluid supplied to said friction brakes.

11. In a braking system for a train of vehicles including a plurality of cars and a locomotive, fluid actuated friction brakes for each of said vehicles, a source of fluid supply under pressure on each of said vehicles for actuating the friction brakes on the same vehicle, a control conduit common to said cars for controlling the pressure of the fluid supplied from each local source of fluid supply to the friction brakes on the same car in response to proportionate reductions of pressure in said control conduit, manually-operable control means upon said locomotive arranged simultaneously to control the fluid pressure in said control conduit and to supply fluid at proportionate pressure to the friction brakes on said locomotive, an electric traction motor for driving said locomotive, a dynamic braking resistor for said traction motor, means for completing a dynamic braking circuit including said motor and said resistor, regulating means including a variable resistor arranged to control the current in said braking circuit, switching means actuable in accordance with a function of the current in said braking circuit for varying the resistance of said resistor, restraining means for said switching means, and means responsive to the pressure of the fluid in said control conduit for changing the setting of said restraining means.

12. In a braking system for a train of vehicles including a plurality of cars and a self-propelled locomotive, fluid actuated friction brakes for each of said vehicles, a source of fluid supply under pressure on each of said vehicles for actuating the friction brakes on the same vehicle, a control conduit common to said cars and containing a fluid under pressure arranged to control the pressure of the fluid supplied from each local source of fluid supply to the friction brakes on the same car in proportion to reductions of fluid pressure in said control conduit, manually-operable control means upon said locomotive arranged simultaneously to control the fluid pressure in said control conduit and to supply fluid at proportionate pressure to the friction brakes on said locomotive, a direct current electric traction motor for driving said locomotive, said motor having an armature and a series field winding, a direct current generator for supplying current to said motor, said generator having a field exciting winding, a prime mover mounted upon said locomotive and connected to drive said generator, a dynamic braking resistor, means for completing a dynamic braking circuit including said armature and said resistor, means for connecting said generator in series circuit relation with said series field winding across a portion of said dynamic braking circuit thereby to excite the series field winding, a regulating resistor connected in series circuit relation with said field exciting winding, switching means for varying the resistance of said regulating resistor, actuating means for said switching means cumulatively responsive to the currents in said armature and said series field winding, restraining means for said switching means, and means responsive to the fluid pressure in said control conduit for proportionately adjusting the setting of said restraining means.

13. In a braking system for a train of vehicles including a plurality of cars and a locomotive, fluid actuated friction brakes for each of said vehicles, a source of fluid supply under pressure on each of said vehicles for actuating the friction brakes on the same vehicle, a control conduit common to said cars and containing a fluid under pressure arranged to control the pressure of the fluid supplied from each local source of fluid supply to the friction brakes on the same car in proportion to increases in pressure of the fluid in said control conduit, manually-operable control means upon said locomotive arranged simultaneously to control the fluid pressure in said control conduit and to supply fluid at proportionate pressure to the friction brakes on said locomotive, an electric traction motor for driving said locomotive, a dynamic braking resistor for said traction motor means for completing a dynamic braking circuit including said motor and said resistor, regulating means including a variable resistor arranged to control the current of said braking circuit, switching means actuable in accordance with a function of the current in said braking circuit for varying the resistance of said resistor, restraining means for said switching means, and means responsive to the pressure of the fluid in said control conduit for proportionately adjusting the setting of said restraining means.

14. In a braking system for an electrically driven vehicle, a friction brake for said vehicle, actuating means for said friction brake, manually operable control means on said vehicle operable in conjunction with said actuating means to control the friction braking effort applied to said vehicle, an electric traction motor for driving said vehicle, a dynamic braking resistor for said traction motor, means for completing a dynamic braking circuit including said motor and said resistor, automatic regulating means responsive to a function of the dynamic braking effort of said traction motor for maintaining said dynamic braking effort substantially constant over a wide range of vehicle speeds, and means controlled by said manually controllable means for controlling the standard of regulation of said regulating means in accordance with the controlled friction braking effort applied to said vehicle.

15. In a braking system for a train of vehicles including a locomotive and a trailing train, friction brakes for said locomotive and for said trailing train, said friction brake having a predetermined braking effort characteristic in relation to vehicle speed, actuating means for said friction brakes, manually operable control means on said locomotive operable in conjunction with said actuating means simultaneously to apply said friction brakes to said locomotive and to said trailing train in continuously proportional relation, an electric traction motor for driving said locomotive, a dynamic braking resistor for said traction motor, means for completing a dynamic braking circuit including said motor and said resistor, automatic regulating means responsive to a function of the dynamic braking effort of said traction motor to render the characteristic of said dynamic braking effort qualitatively similar to said friction braking effort characteristic over a wide range of vehicle speeds, and means controlled by said manually controllable means in accordance with the magnitude of said friction braking effort for controlling the setting of said regulating means to maintain the total dynamic and friction braking effort of said locomotive quantitatively less than the friction braking effort of said trailing train.

HAROLD S. OGDEN.